Oct. 26, 1926.
H. SIPRELLE ET AL
1,604,665
SHOCK ABSORBER
Filed May 7, 1926  2 Sheets-Sheet 2
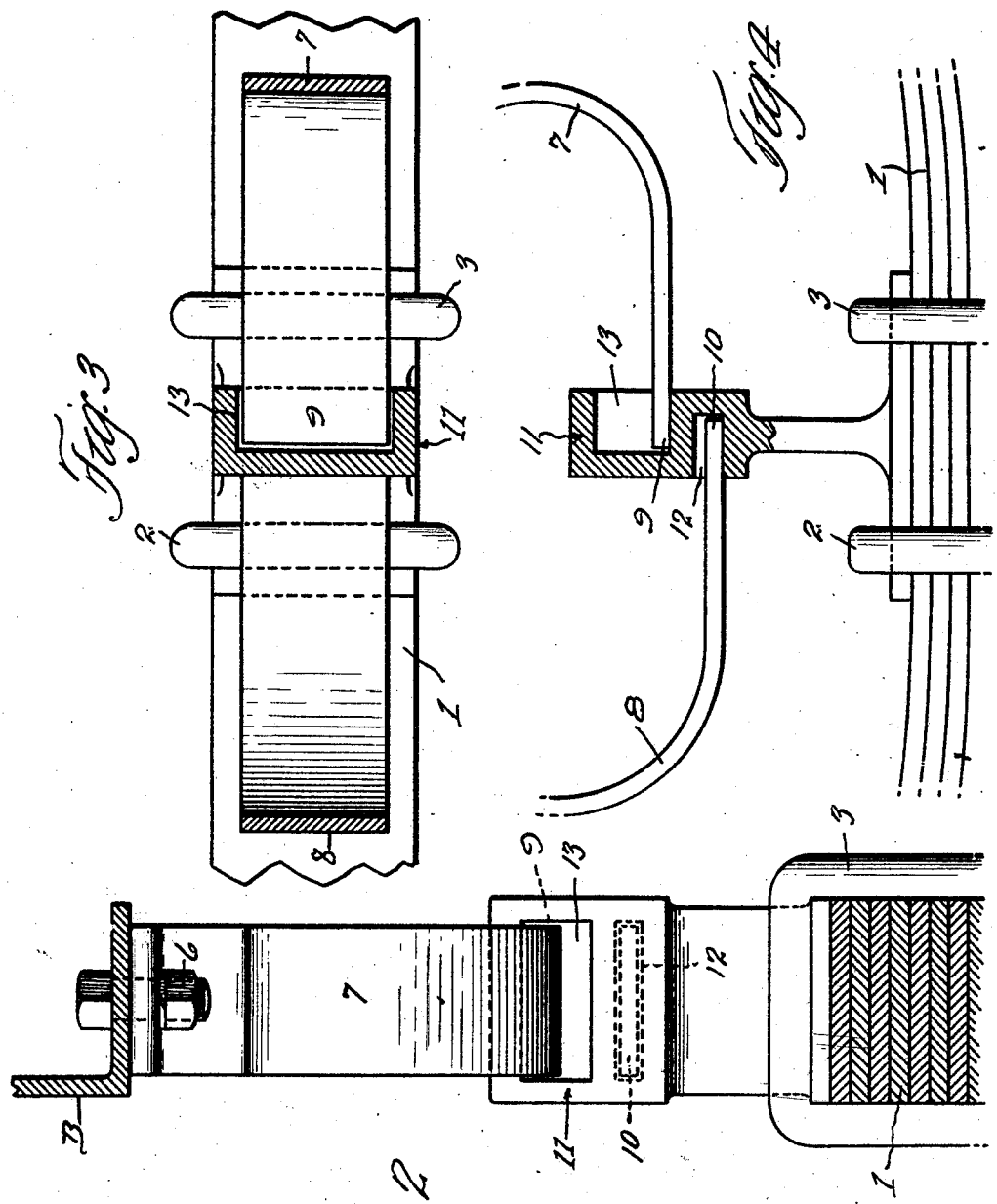
INVENTOR
Harry Siprelle
Max C. Learn
By
Hull Brock & West
Attys.

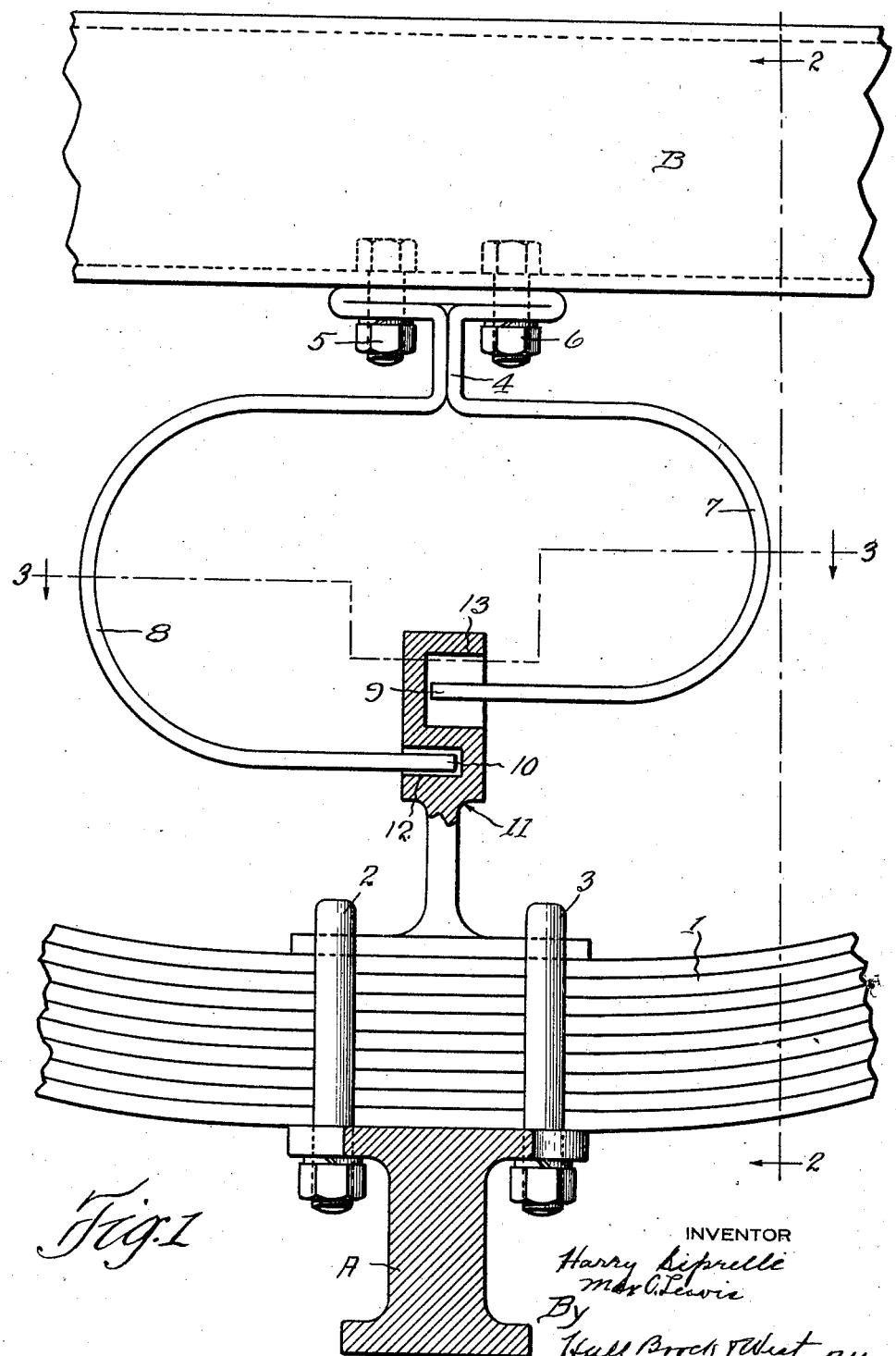

Patented Oct. 26, 1926.

1,604,665

UNITED STATES PATENT OFFICE.

HARRY SIPRELLE, OF CLEVELAND, AND MAX C. LEWIS, OF LAKEWOOD, OHIO.

SHOCK ABSORBER.

Application filed May 7, 1926. Serial No. 107,340.

This invention relates to shock absorbers for vehicles and particularly automobiles and the main object of the invention is to provide a shock absorber of the character described which is simple in construction, inexpensive to manufacture and well adapted for quantity production at comparatively low cost.

Another object of the invention is to provide an efficient construction of shock absorbing means which will afford increased resilience of the cushion both in resisting the downward impact of the body of the car and the upward or rebounding movement of the arms of the vehicle spring.

Another object of the invention is to provide a shock absorber which will absorb the shocks due to minor vibrations of the vehicle axle without transmitting said minor vibrations to either the car body or the vehicle spring.

Further and more limited objects of my invention will appear as the description proceeds and by reference to the accompanying drawing in which Fig. 1 is a fragmentary view in side elevation showing our improved shock absorber secured on a vehicle; Fig. 2 a vertical sectional view on the line 2—2 of Fig. 1; Fig. 3 is a horizontal sectional view on the line 3—3 of Fig. 1; and Fig. 4 is a fragmentary detail view similar to Fig. 1 with the parts in a different position.

In the drawings the numeral 1 designates the usual automobile spring which is made up of several leaves and secured to the vehicle axle A by a pair of clips 2 and 3 as shown in Fig. 1. Our improved shock absorber comprises a member 4 which is preferably made of spring steel. The member 4 is preferably made in one piece and is secured to the vehicle body B by suitable bolts 5 and 6. The member 4 is formed with a pair of oppositely disposed loops 7 and 8 having their lower ends 9 and 10 overlapping and spaced apart as shown most clearly in Fig. 1.

Secured to the spring 1, beneath the spring clips 2 and 3, is a block designated generally at 11. This block 11 has a pair of oppositely disposed recesses 12 and 13 therein spaced apart and opening in opposite directions as shown in Figs. 1 and 4. The block 11 is of such a size and so positioned that in the normal position of the spring 1 the ends 9 and 10 of the loops 7 and 8 project into the recesses 12 and 13 as shown in Fig. 1 without engaging the sides or top walls of the recesses. From an inspection of the drawing it will be seen that the loop 8 is larger than the loop 7 and hence more resilient than the loop 7. It will also be seen that the recess 13 is considerably larger than the recess 12.

The operation of the shock absorber is as follows: Upon slight movement of the body B towards the spring 1 the end 10 engages the bottom of recess 12 and loop 8 is compressed. Upon further downward movement of body B the end 9 of loop 7 engages the bottom of recess 13 and loop 7 is compressed (see Fig. 4), and upon still further downward movement of the body B both loops 8 and 7 are compressed. The size of the loops 7 and 8 is such that these loops are fully compressed before any compression of the spring 1 occurs. It will therefore be seen that our shock absorber cushions the comparatively small vibrations of the body without transferring such small vibrations to the spring 1. When the axle A receives a shock sufficiently great the body B moves downwardly and fully compresses loops 7 and 8 and then compresses spring 1 in the usual manner.

Our shock absorber also acts to check the rebound of the body B as follows: Upon the first upward movement of the body B the end 9 of loop 7 is pulled upwardly and engages the upper side of recess 13, the end 10 of loop 8 is moved upwardly and engages the top of recess 12. Further upward movement of the body B will tension the loops 7 and 8 in the opposite direction and thereby check the rebound of the body B. During this interval the rebound movement of the spring 1 will have been dissipated and the body will again assume its normal position with respect to the spring 1 and the loops 7 and 8 will assume the position shown in Fig. 1.

Our shock absorber is particularly well adapted for automobiles equipped with balloon tires. The minor vibration of the axle resulting from the use of balloon tires is not transmitted to the car body and the rebound movement of the body is also materially checked.

It will now be clear that we have provided a device which will accomplish the objects of the invention as hereinbefore stated.

Having thus described our invention, what we claim is:—

1. In a shock absorber of the class described a spring member adapted to be secured to a vehicle body and having a pair of oppositely disposed loops, one of said loops being less resilient than the other and the lower ends of said loops being disposed one above the other, a second member adapted to be secured to a vehicle spring and having a pair of oppositely disposed recesses therein adapted to receive the lower ends of said loops, one of said recesses being larger than the other.

2. In a device of the class described, a spring member adapted to be secured to a vehicle body and having a pair of oppositely disposed loops, one of said loops being less resilient than the other, the lower ends of said loops being disposed one above the other, a second member adapted to be secured to a vehicle spring and having a pair of openings therein disposed one above the other and adapted to receive the lower end of said less resilient loop and the lower opening adapted to receive the lower end of said other loop.

3. A shock absorber for vehicle springs comprising an upper member having a pair of oppositely disposed resilient loops and adapted to be secured to a vehicle body, a lower member adapted to be secured to a vehicle spring, said lower member comprising a block having a pair of oppositely disposed recesses therein one above the other and opening outwardly in opposite directions, the ends of said loops engaging in said recesses whereby to cushion the downward movement of the body with respect to the vehicle spring and to decrease the rebound of the vehicle body.

4. A shock absorber of the class described, a member adapted to be secured to a vehicle body and provided with a pair of oppositely disposed resilient loops, the lower ends of said loops being disposed one above the other, a second member adapted to be secured to a vehicle spring and having a pair of openings therein disposed one above the other and adapted to receive the lower ends of said pair of loops respectively.

5. A shock absorber of the class described, a member adapted to be secured to a vehicle body and provided with a pair of oppositely disposed resilient loops, the lower ends of said loops being disposed one above the other, a second member adapted to be secured to a vehicle spring and having a pair of openings therein disposed one above the other and adapted to receive the lower ends of said pair of loops respectively, the size of said openings being such as to allow a limited movement of the vehicle body without tensioning either of said resilient loops.

6. In a shock absorber of the class described, a pair of spring members looped in opposite directions and having their lower ends positioned one over the other and spaced apart, means for securing said members to a vehicle body, a member adapted to be secured to a vehicle spring and having a pair of openings therein one above the other and adapted to receive therein the lower ends of said resilient members.

7. A shock absorber as set forth in claim 6 in which said openings are of such a size as to allow a limited movement of the lower ends of said spring members without tensioning either of said spring members.

In testimony whereof, we hereunto affix our signatures.

HARRY SIPRELLE.
MAX C. LEWIS.